United States Patent

Hill et al.

[11] Patent Number: 5,914,979
[45] Date of Patent: Jun. 22, 1999

[54] ROTATING-TRANSLATIONAL DRIVE MECHANISM FOR POSITIONING DEVICES IN A MELTER

[75] Inventors: Adrian A. Hill; Thomas L. Eddy, both of Idaho Falls, Id.

[73] Assignee: MeltTran, Inc., Idaho Falls, Id.

[21] Appl. No.: 08/920,670

[22] Filed: Aug. 29, 1997

Related U.S. Application Data

[60] Provisional application No. 60/027,851, Aug. 30, 1996.

[51] Int. Cl.[6] .................................................. H05B 7/10
[52] U.S. Cl. .................................. 373/94; 373/18; 373/90
[58] Field of Search .................................. 373/18, 90, 98, 373/67, 95, 101, 85, 94; 219/121

[56] References Cited

U.S. PATENT DOCUMENTS

| Re. 28,570 | 10/1975 | Tylko . | |
|---|---|---|---|
| 3,651,238 | 3/1972 | Schlienger | 373/90 |
| 3,749,803 | 7/1973 | Camacho . | |
| 3,894,573 | 7/1975 | Paton et al. | 219/121 |
| 4,018,973 | 4/1977 | Paton et al. | 373/18 |
| 4,177,060 | 12/1979 | Tylko . | |
| 4,674,102 | 6/1987 | Ehle | 373/98 |
| 5,103,458 | 4/1992 | Soykan | 373/67 |

FOREIGN PATENT DOCUMENTS

| 0207929 | 1/1987 | European Pat. Off. . |
|---|---|---|
| 338164 | 6/1921 | Germany . |

OTHER PUBLICATIONS

Dialog® File 351: Derwent WPI English abstract of EP 207929 (Jan. 7, 1987).

*Primary Examiner*—Teresa Walberg
*Assistant Examiner*—Quang Van
*Attorney, Agent, or Firm*—Morrison & Foerster LLP

[57] ABSTRACT

An apparatus for providing three dimensional positioning to the ends of one or more translating elements which are normally restricted to translation along the longitudinal axes of the elements. A cartridge assembly including a cylinder at least partially formed of a ceramic element holds the translating element at an angle to the center axis of the cylinder. The cartridge assembly rotates within a cylindrically shaped chamber in a lid assembly. The lid assembly is mounted on the port of a chamber where the translating element is to be positioned, thereby allowing the translating element to extend into the chamber. The center axis of the cylindrical chamber of the lid assembly is at an angle to the center axis of the port of the chamber. A rotational drive unit rotates the cartridge assembly within the lid assembly. A translational drive unit longitudinally drives the translating element within the cartridge assembly.

15 Claims, 7 Drawing Sheets

ROTATING-TRANSLATIONAL DRIVE MECHANISM FOR POSITIONING DEVICES IN A MELTER

CROSS-REFERENCE TO RELATED APPLICATIONS

This application claims the benefit of U.S. provisional application No. 60/027,851, filed Aug. 30, 1996.

FIELD OF THE INVENTION

The present invention pertains generally to an apparatus for the positioning of a rod, electrode, torch or other device to obtain a three dimensional movement of the device. More specifically, the invention is an arrangement addition to those inherent to the principal axis of motion, i.e., in an arrangement that allows relocation of the ends of a driven component to locations at right angles to the normal translated position.

BACKGROUND OF THE INVENTION

Translating devices have traditionally been used in many ways including the movement of control elements. These devices are required to be mounted on a rigid support to withstand the axial loading of both the driving mechanism and the control element. Examples of applications include the positioning of loads for manufacture, control rods in nuclear reactors, and graphite electrodes in electric arc furnaces.

Rotational movement of translational devices has been obtained by mounting the device in a gimbal, which permits the device to be located at an infinite number of positions with a similar complexity in specifying the exact location and controlling the movement. Gimbals plus translational drives have been used to change the position of water cooled plasma torches in plasma torch melters. The relatively high temperature and large diameter of graphite electrodes used in plasma arc melters has apparently precluded a similar use. In addition, the graphite-electrode arc melter has usually been used for metal melting or smelting which have good heat conduction to the edges of the melt and have not required lateral movement of the ends of the electrodes. With the processing of more nonmetallic materials in the thermal treatment of hazardous and radioactive waste, the need to manipulate the graphite electrodes is more important because of the lower heat conductivity and lower fluidity of the molten slag or glass at similar temperatures. The capability to move the electrodes laterally is very desirable in this case. For waste processing applications using plasma arc melters, the melter size is compact and the relatively large feed ports and offgas exhaust ports limit space available for the electrode or torch cooling and three-dimensional drive mechanisms. As a result, a simple, compact mechanism for moving the electrode or torch tip both laterally and longitudinally was needed.

The most common way to position a control element, required to be located on an axis other than the main translating axis, is achieved by means of a gimbal. In a melter, this requires a machining of an element which matches a socket in the mounting.

Nuclear reactors use a penetration, tilted to the reactor vessel and core, to locate a control rod in a position not parallel to the vessel axis. This application is not adjustable for different radial positions.

Electric arc furnaces generally use axially translating electrodes mounted vertically in the furnace head. (This application is also not adjustable for different radial positions.)

These furnaces use an electrode positioning device based on a pulley and cable or hydraulic power to position a clamp device on a mast vertically. The electrode is affixed in a clamp attached to the mast to which is attached the bus tubes for power attachment.

SUMMARY OF THE INVENTION

The present invention is a drive mechanism for positioning a device, whereby a lid assembly with a cylindrical chamber having a center axis holds a cartridge assembly adapted to rotate within the cylindrical chamber of the lid assembly. The cartridge assembly is adapted to hold a device to be positioned at an angle to the center axis of the cylindrical chamber of the lid assembly. The cartridge assembly is rotated by a rotational drive unit within the cylindrical chamber of the lid assembly. A translational drive unit is attached to the cartridge assembly for longitudinally driving the device to be positioned. Alternate embodiments of the present invention are adapted to position multiple devices by having one or more lid assemblies and corresponding cartridge assemblies. The devices to be positioned include, but are not limited to, electrodes and torches.

In one embodiment of the present invention device to be positioned in held at an angle of 3.5 degrees to the center axis of the lid assembly.

In an alternate embodiment of the present invention the cartridge assembly is comprised of a rotation plate securely attached to a refractory cylinder, the refractory cylinder adapted to hold the positioning device at an angle to the center axis of the refractory cylinder.

In an alternate embodiment of the present invention the drive assembly for three dimensionally positioning at least one element in a melter has a rotational controller adapted to be rotationally mounted to a melter for rotation in substantially only a single plane, and having an opening for the element to pass therethrough. A translational controller is mounted to said rotational controller and a mount connected to said translational controller is adapted to fix the element with respect to said translational controller and so that the element passes through said opening.

In another embodiment of the present invention the rotational controller includes a first rotational controller, said translational controller comprises a first translational controller and said mount comprises a first mount. The drive assembly further comprising a second rotational controller adapted to be rotationally mounted to the melter for rotation in substantially only a single plane, said second rotational controller adapted to be mounted adjacent said first rotational controller and having an opening for passing a second element therethrough.

In another embodiment of the present invention a lid assembly is rotationally mounted to said rotational controller, wherein said rotational controller is mountable to the melter via said lid assembly, such that said lid assembly is fixed to the melter and said rotational controller is rotatable with respect to said lid assembly and the melter.

In an alternate embodiment of the present invention the cartridge assembly within said lid assembly and rotatable with respect thereto, said cartridge assembly having a cartridge hole which is alignable with said opening of said rotational controller to allow the element to pass through both said opening and said cartridge hole.

In an alternate embodiment of the present invention the cartridge assembly is fixedly mounted to said rotational controller.

In an alternate embodiment of the present invention the a portion of said cartridge assembly comprises a ceramic.

In an alternate embodiment of the present invention the cartridge assembly further comprises a seal surrounding said cartridge hole, said seal adapted to prevent gases and liquids from passing between said seal and the element which said cartridge assembly is adapted to receive.

In an alternate embodiment of the present invention at least one bearing provided between said cartridge assembly and said lid assembly, wherein said cartridge assembly rotates on said at least one bearing with respect to said lid assembly.

In an alternate embodiment of the present invention the lid assembly comprises a chamber and a cooling jacket surrounding said chamber.

In an alternate embodiment of the present invention the opening is formed at a predetermined angle to said single plane and is thereby adapted to orient the element to said single plane at said predetermined angle.

In an alternate embodiment of the present invention the predetermined angle is a small acute angle with respect to a perpendicular to said single plane.

In an alternate embodiment of the present invention the lid assembly is mounted to the melter at a predetermined lid assembly angle.

In an alternate embodiment of the present invention the predetermined lid assembly angle is a small acute angle.

There are several position set points or reference positions that can be conveniently programmed and identified as positions to which the device can be moved with a simple command, namely: ignition position, tapping position, and emergency shutoff procedure positioning. These positions are accomplished using traditional step motors and step motor controllers to move in the translational and rotational directions. The instructions to the controllers are from the master computer and manual inputs from the operator(s).

BRIEF DESCRIPTION OF THE ACCOMPANYING DRAWINGS

Reference will herein be made to the accompanying drawings wherein like reference numerals throughout the various Figures denote like elements, and wherein:

FIG. 1 schematically depicts a plasma arc melter system, which is a preferred application for this invention, with either graphite electrodes or a plasma torch.

The invention and its various embodiments are described in more detail in the following description.

DETAILED DESCRIPTION OF THE PRESENT INVENTION

The present invention provides a drive mechanism for positioning electrodes in a plasma arc melter. In the following description numerous details are set forth in order to enable a through understanding of the present invention. However, it will be understood by those of ordinary skill in the art that these specific details are not required in order to practice the invention. Further well-known elements, devices, process steps and the like are not set forth in detail in order to avoid obscuring the present invention.

Figure 1:
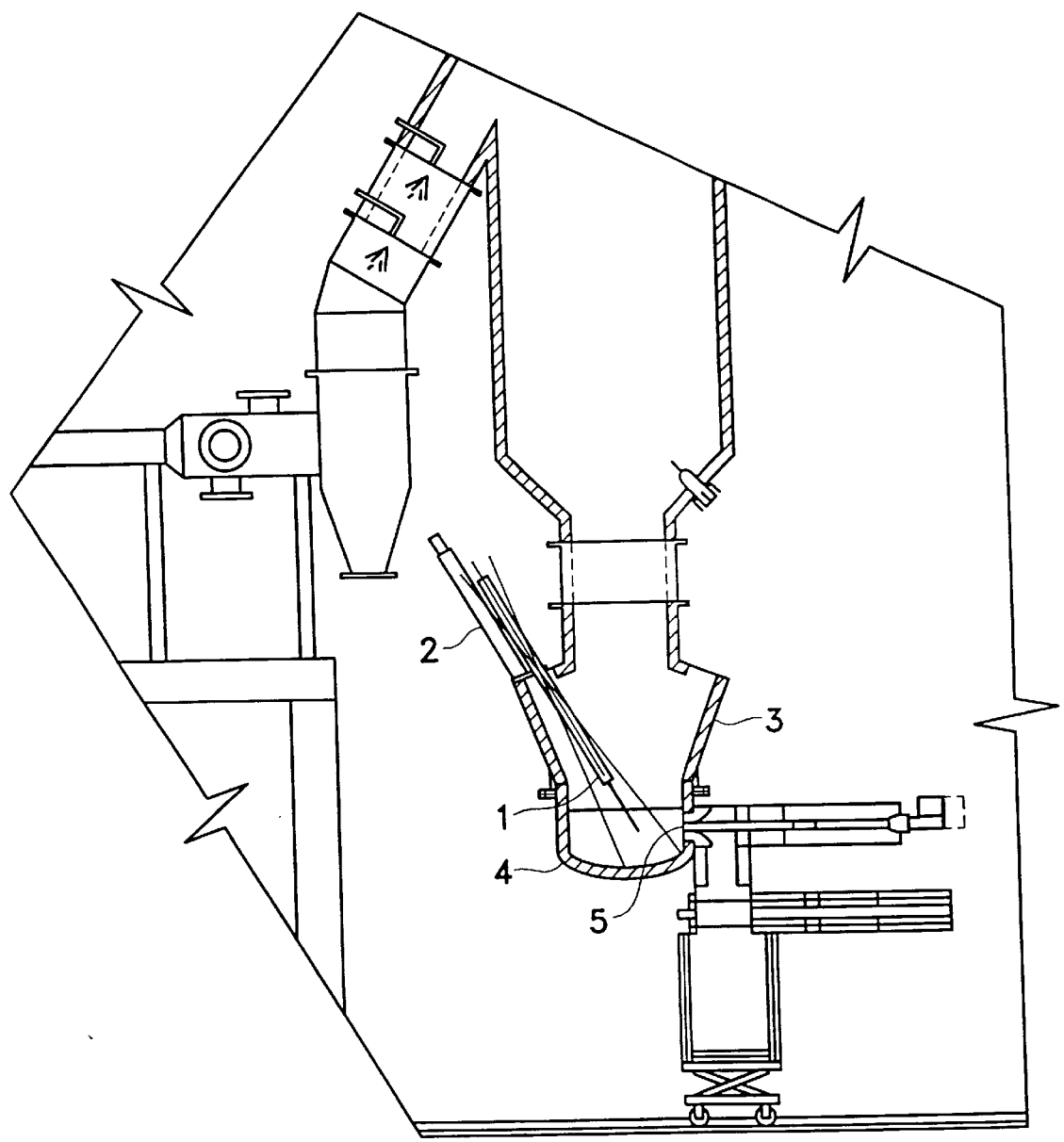

The present invention can be a component of a plasma arc melter system as described in U.S. patent application Ser. No. 08/764525, filed Dec. 12, 1996 and claiming the benefit of U.S. provisional Patent Application No. 60/021146, filed Jul. 3, 1996, both of which are incorporated by reference herein. In such systems, graphite electrodes or plasma torches are used to apply energy to the material to be melted. Material to be melted by the plasma arc melter is fed into the crucible (4). As seen in FIG. 1, the electrode (1) is mounted with the drive mechanism (2) on the plenum (3). This allows the electrode to move in the melt zone of the crucible (4) and be applied, as needed, to the vicinity of the tap hole (5).

Figure 2:
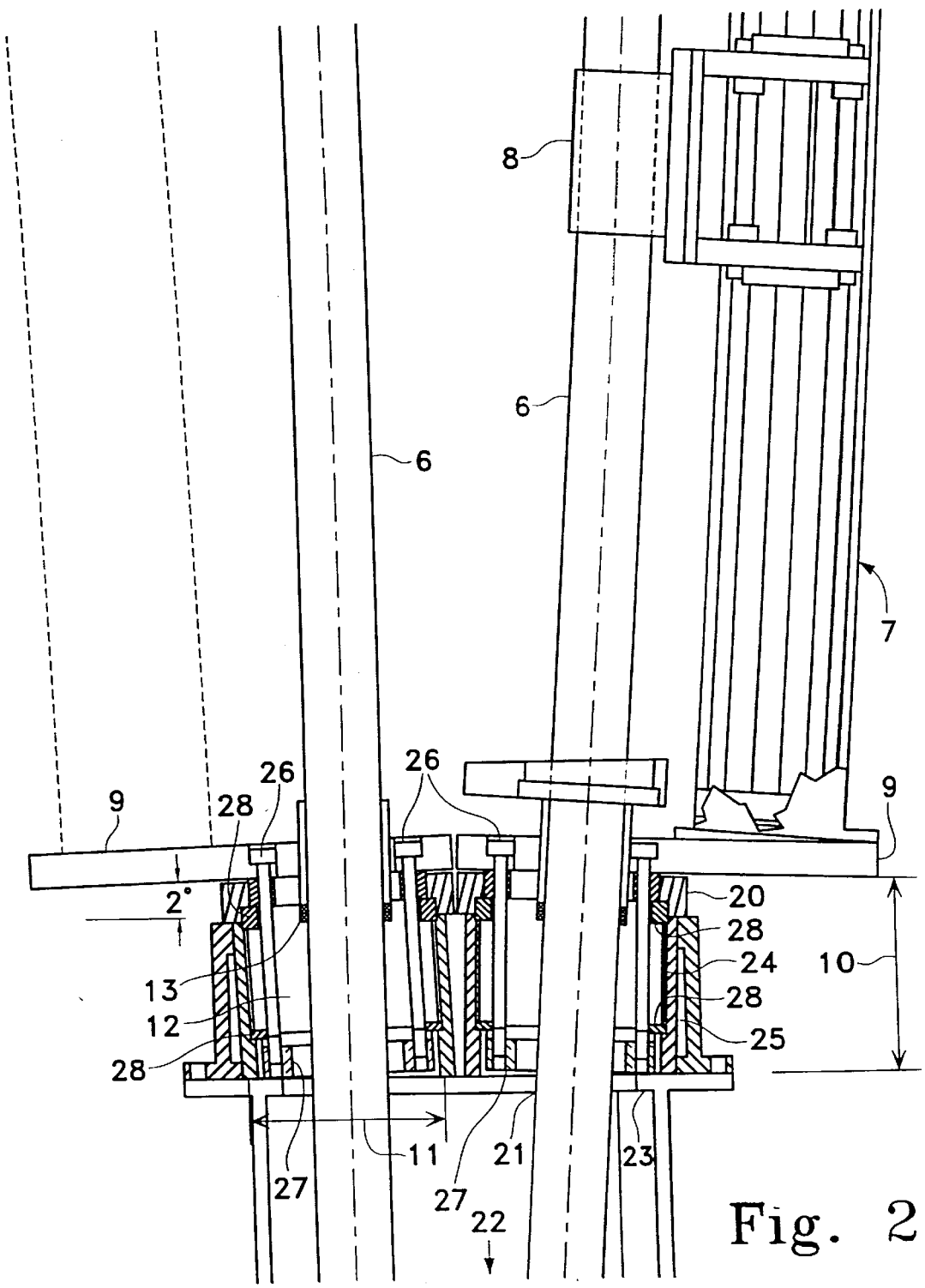
FIG. 2 depicts a representation of the system apparatus in an arrangement of the elements, for a dual graphite electrode drive mechanism, in a plasma arc melter. The figure shows the arrangement of the plate (and mounting), identified as the rotation plate and lid, and the retention element, identified as a cartridge assembly.
Figure 3:
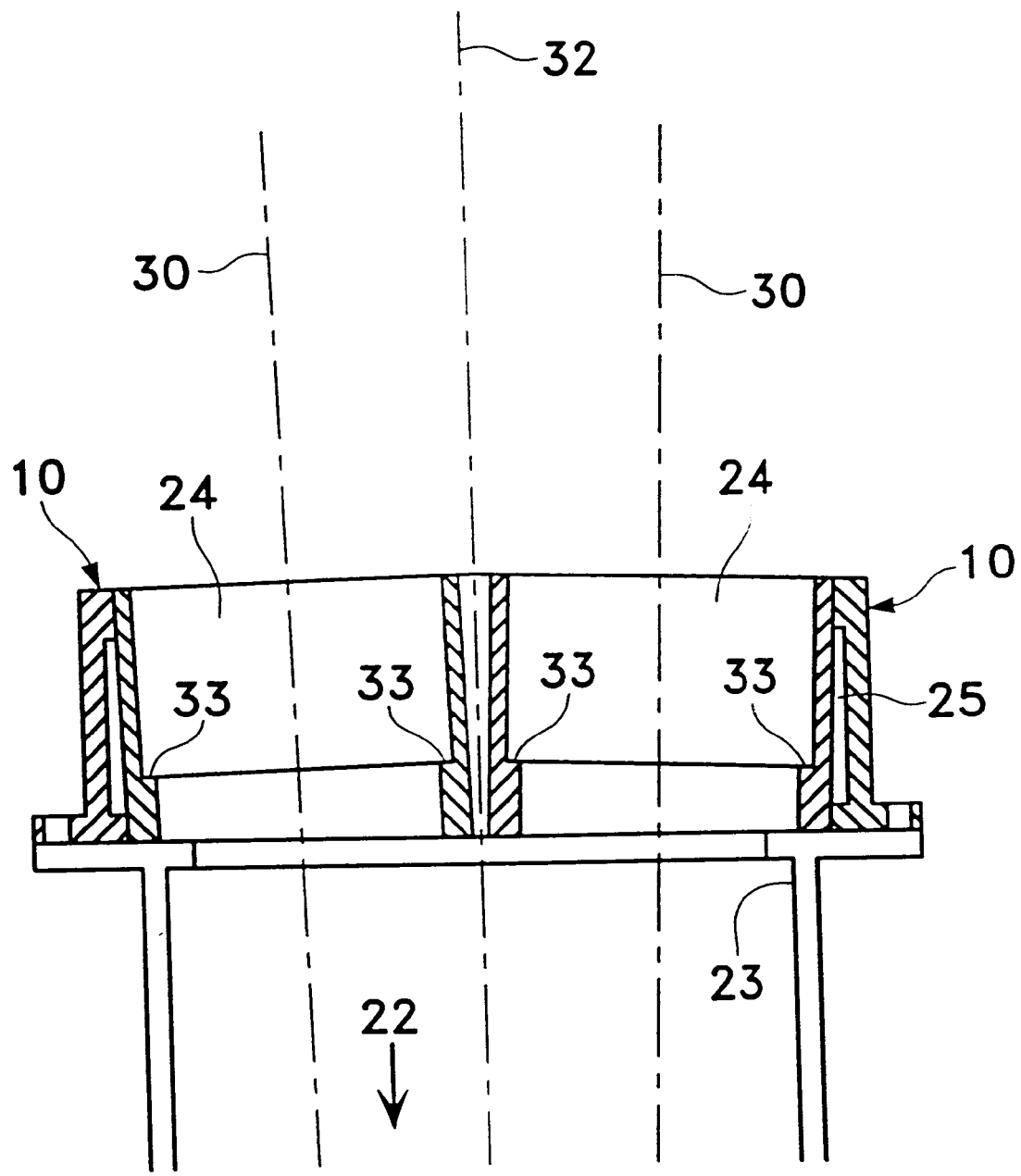
FIG. 3 is a cross sectional side view of the dual drive mechanism shown in FIG. 2 with the cartridge assembly and electrodes removed to show the lid assembly mounted on the melter port.

A possible application embodied by the present patent is shown in FIG. 2. FIG. 2 is a cross-sectional view side of a dual drive mechanism arrangement that shows the interrelation of the melter, electrodes, drive mechanism, rotation plates, lid assembly, and cartridge assemblies. FIG. 3 shows the lid assembly (10) without the cartridge assembly or electrodes. The lid assembly (10) is securely attached to the exterior of the wall of the melt chamber (22) at a port (21) in a wall (23) of the melt chamber as shown in FIGS. 1–3. The lid assembly can be attached by any secure means such as by bolting or welding. The lid assembly (10) forms two cylindrical chambers (24). The center axis (30) of the cylindrical chamber (24) of the lid assembly (10) is at an angle of about 2° to the axis (32) of the melter port (21). The cylindrical chambers of each lid assembly are arranged such that both of their center axes are at an angle of about 2 degrees to the axis of the melter port (21) and at an angle of about 4 degrees to each other. The lid assembly angle is dependent on the size of both the melter and electrode, as well as the positioning of the melter port in relation to the melt zone of the crucible and this would vary in other embodiments employing components having different dimensions, for use in processing different materials, etc. A lip (33) is formed on the end of the cylindrical cylinder (24) adjacent to the melter port (21) to retain the cartridge assembly in the cylindrical chamber (24). A cooling jacket (25) surrounds the lid assembly chamber (24). Water or other coolant flows through the cooling jacket (25) to provide cooling to the lid assembly (10). As this embodiment of the present invention is a dual drive mechanism arrangement, a second lid assembly is located adjacent to the first lid assembly.

While FIGS. 2 and 3 show a dual drive mechanism formed from a single lid assembly with two cylindrical chambers, other embodiments of the present invention could use adjacent lid assemblies with only one cylindrical chamber.

A cartridge assembly formed from a ceramic element (12) holds the electrode (6) at an angle of about 3.5° to the centerline axis of the cylindrical ceramic element (12). As with the lid assembly angle, the cartridge assembly angle is dependent on the size of both the melter and electrode, as well as the positioning of the melter port in relation to the melt zone of the crucible and the material to be processed. Each cartridge assembly (11) is bolted or otherwise securely fixed to the rotation plate (9) so that the ceramic (12) with its packing seat (13), rotate with the mechanism around the centerline of the electrode. Bolts (26) pass through holes bored in the ceramic element (12) to a plate (27) threaded to accept the bolts (26). The rotation plate, with the rotational drive unit, is at about a 2 degree angle from the axis of the melter port (21). The cartridge assembly rotates on bushings (28) in the cylindrical chamber (24), also at about 2 degrees, located between the chamber (24) and the lid assembly (10). The bushings (28) are formed from a standard material for bushings such as brass or the equivalent. The electrode (6) is attached parallel to the translational drive unit (7) by a clamp on the carriage (8). The translational drive unit and the electrodes are rotated by the rotation plate (9) on an axis in of about 2 degrees to the lid assembly (10).

Each cartridge assembly (11) is assembled with bolts, studs or other equivalent clamping mechanism that clamp the assemblies to the rotation plate. A retaining plate (20) holds the cartridge assembly (11) to the lid assembly (10). The ceramic (12) of the cartridge is bored for the electrode at an angle of about 3½ degrees in the preferred embodiment. This bore is counter-bored for a packing seal (13) which seals the mechanism from the melter but allows translation of the electrode. Each electrode is sealed and retained in a cartridge assembly which retains the gaseous products from the melter, allowing the electrode to be translated by the drive unit and which contains a ceramic element which electrically isolates the electrode from the metal parts of the lid assembly. The packing seal can use any type of packing seal applicable to high temperature applications such as an alumina or magnesia felt. In this manner, the cartridge seal seals the melter and provides electrode insulation from the melter.

A rotational drive unit is attached to the rotation plate to rotate the cartridge assembly (11) within the lid assembly. Stepper motors are used for both the rotational and translation drive units to allow precise movement and indexing of the movement of the electrode. Alternatively, other types of motors could be used in combination with position sensors to provide feedback information on the rotational and longitudinal position of the electrode to the computer used in controlling the position of the electrodes.

Figure 4:
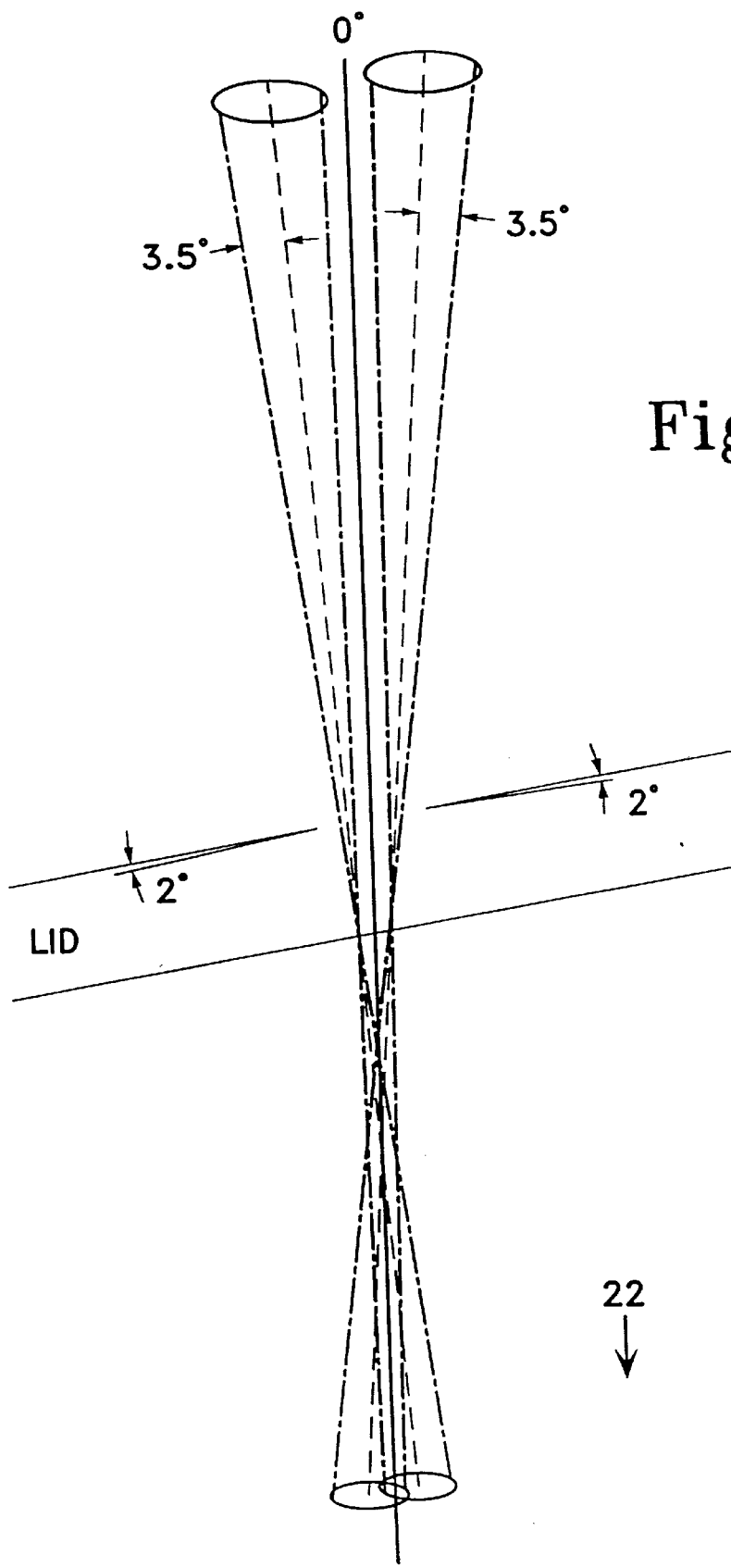
FIG. 4 shows the potential positions of the ends of the electrodes in the dual array. The arrangement shown illustrates a lid angle of 2 degrees and a cartridge angle of 3.5 degrees.

Some of the benefits of the present invention over current translational drive mechanisms are shown in FIG. 4. Current translational drive mechanisms can only move electrodes vertically up and down. But FIG. 4 illustrates the potential position of the angle of the lid angle (e.g. about 2 degrees) and the cartridge angle (e.g. about 3½ degrees). The position of the ends of electrode can be established by the initial position of the cartridge angle within the rotation plate/cartridge assembly and, during operation, by rotation of the rotation plate. The former is established at assembly. The latter, during operation, by rotation of the drive unit and rotation plate by a drive motor. In this manner the present invention allows the electrodes to be placed in different positions of the melt zone (22) of the crucible. Additionally, the offset rotation of each electrode allows the relative position of the torches to be controlled by either rotating them together or rotating them apart.

As can be seen from the embodiment shown in FIG. 4, the present invention is applicable to having single, dual or more drive mechanisms to accommodate applications where any number of electrodes or other devices are to be used.

While the above embodiments utilized an electrode, alternate embodiments of the present invention can replace the electrode with a plasma torch, oxygen lance, or any diagnostic type probe. In an alternate embodiment of the present invention, the ceramic element can be removed to allow for a water cooled torch.

While the above embodiment utilizes a ceramic element in the cartridge assembly, other embodiments could use other refractory, dielectric or metal elements.

Though this illustration shows a dual drive mechanism, on a single penetration, the apparatus is adaptable to a single drive mechanism mounting on a single penetration as is discussed next.

Figure 5:
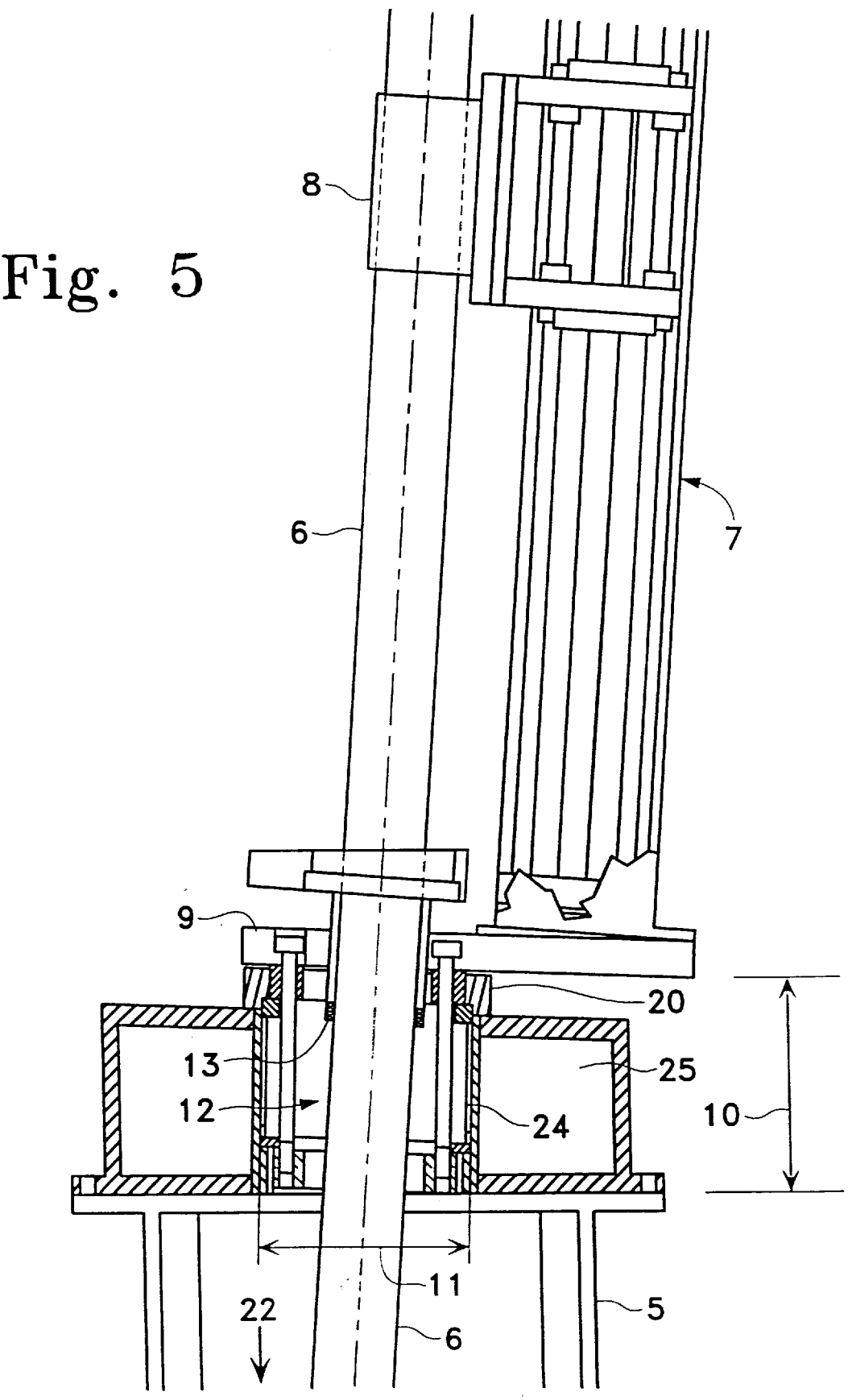
FIG. 5 depicts a representation of the apparatus in an arrangement of the elements for a single graphite electrode drive mechanism in a plasma arc melter.

The application of the present invention as assembled on a single port of a plenum is illustrated in FIG. 5. This is an application where a second assembly could be used in a separate port on the plenum. This arrangement uses the same elements as a dual drive mechanism but gives additional position as the mechanisms can be rotated through a greater arc without being restricted by an adjacent mechanism. The single lid assembly (10) is simplified, having only a single lid angle with corresponding cartridge.

Figure 6:
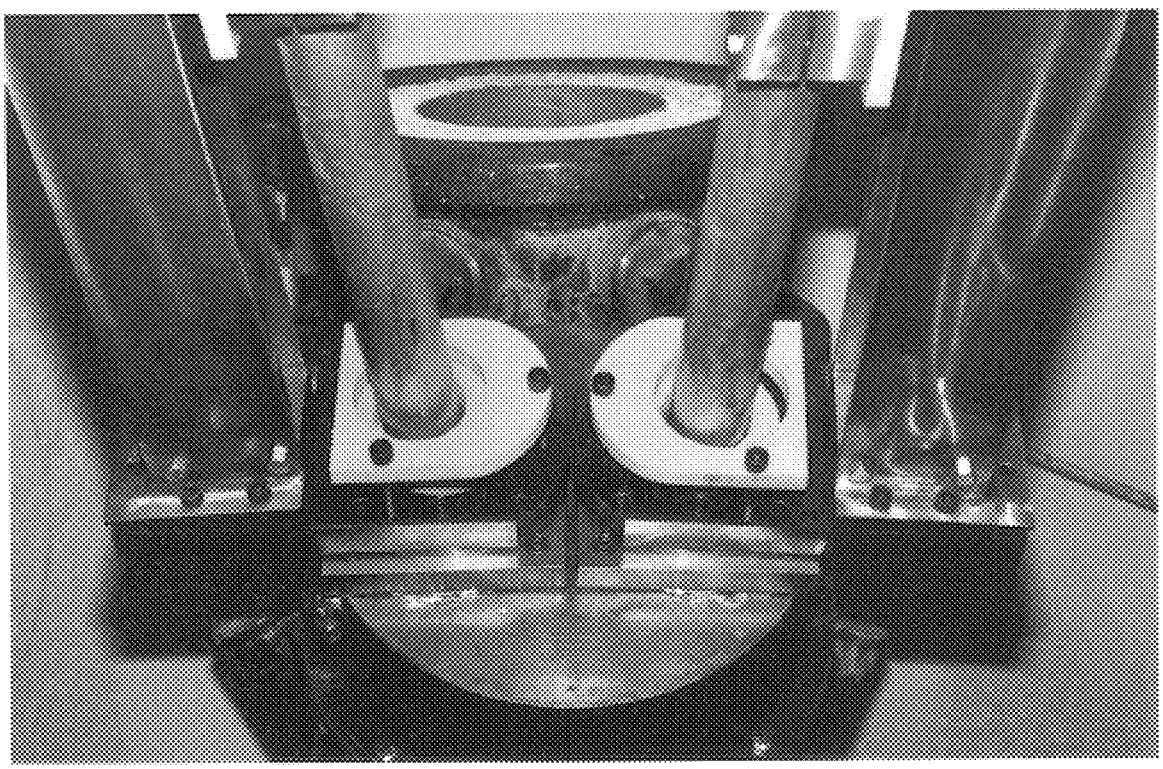
FIG. 6 is an upper perspective view of the dual drive mechanism showing the electrodes and rotation plates.
Figure 8:
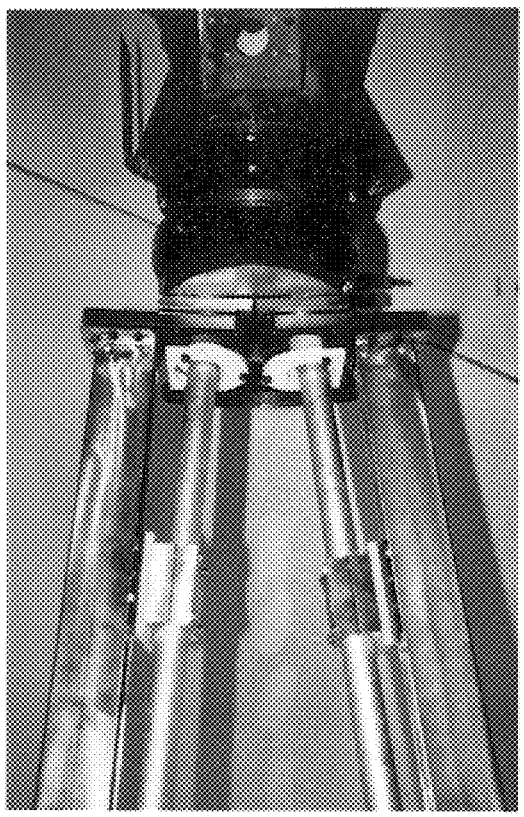
FIG. 8 is a close up side view of the dual drive mechanism.
Figure 7:
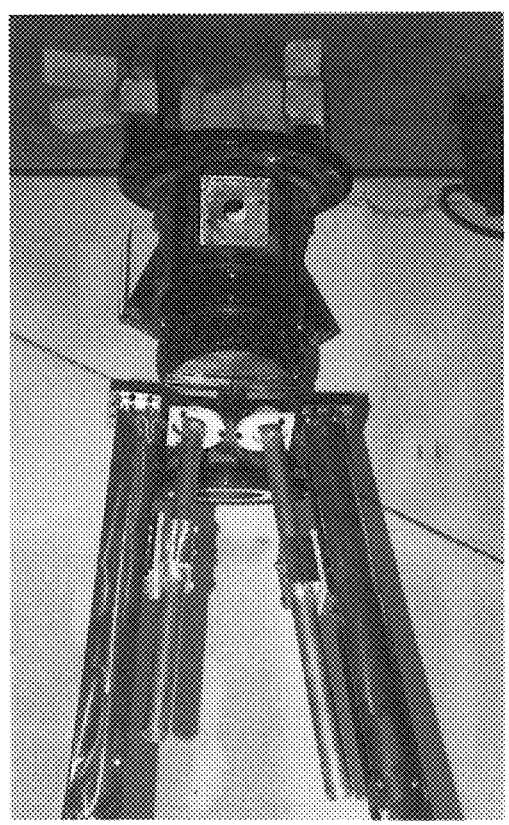
FIG. 7 is a side view of the dual drive mechanism with the rotational plate mounted at an angle of 2.5 degrees.

FIGS. 6, 7 and 8 show alternate views of the dual drive mechanism installed in a plasma arc melter. FIG. 7 is a side view of the cartridge with the rotational drive plate mounted at an angle of 2.5 degrees.

This invention allows a control element, for example, an electrode, to be positioned in a number of positions perpendicular to the principle axis of motion with a simple rotational apparatus that can be set for a wide range of position required for the ignition, tapping, and normal operation. Additionally, the compact design of the present invention allows for multiple drive mechanisms to be placed on ports of the melter without interfering with the feed ports and offgas exhaust ports. The cooling provided by the water jacket and the sealing of the mechanism from the melt zone allows three dimensional movement of the end of the electrode despite the high temperature of the electrode and its relatively large diameter.

From the foregoing description, it can be seen that the present invention provides a design that can be arranged to provide a wide range of potential positions by rearrangement and selection of either or both lid angle and cartridge angle. As various changes can be made in the apparatus without departing from the spirit or scope of the following claims, it is intended that all matter contained in the above description or shown in the accompanying drawings should be interpreted as illustrative and not in a limiting sense.

We claim:

1. A drive mechanism for positioning a device, comprising:

a lid assembly with a cylindrical chamber, the cylindrical chamber having a center axis;

a cartridge assembly including a cylinder adapted to rotate within the cylindrical chamber of the lid assembly, the cartridge assembly adapted to hold a device to be positioned at an angle to the center axis of the cylindrical chamber of the lid assembly, wherein the cartridge assembly further comprises a rotation plate securely attached to said cylinder, said cylinder comprising a ceramic element and adapted to hold the device at an angle to the center axis of the cylinder;

a rotational drive unit for rotating the cartridge assembly with respect to the cylindrical chamber of the lid assembly; and a translational drive unit attached to the cartridge assembly for longitudinally driving the device to be positioned.

2. A drive mechanism as in claim 1, wherein the device to be positioned is held at an angle of about 3.5 degrees to the center axis of the cylindrical chamber.

3. A drive assembly for three dimensionally positioning at least one element in a melter, said drive assembly comprising:

a rotational controller adapted to be rotationally mounted to a melter for rotation in substantially only a single plane, and having an opening for the element to pass therethrough;

a translational controller mounted to said rotational controller; and a mount connected to said translational controller and adapted to fix the element with respect to said translational controller and so that the element passes through said opening.

4. The drive assembly of claim 3 wherein said rotational controller comprises a first rotational controller, said translational controller comprises a first translational controller and said mount comprises a first mount, said drive assembly further comprising:

a second rotational controller adapted to be rotationally mounted to the melter for rotation in substantially only a single plane, said second rotational controller adapted to be mounted adjacent said first rotational controller and having an opening for passing a second element therethrough;

a second translational controller mounted to said second rotational controller; and a second mount connected to said second translational controller and adapted to fix the second element with respect to said second translational controller and so that the second element passes through said opening of said second rotational controller.

5. The drive assembly of claim 3, further comprising:

a lid assembly rotationally mounted to said rotational controller, wherein said rotational controller is mountable to the melter via said lid assembly, such that said lid assembly is fixed to the melter and said rotational controller is rotatable with respect to said lid assembly and the melter.

6. The drive assembly of claim 5, further comprising:

a cartridge assembly within said lid assembly and rotatable with respect thereto, said cartridge assembly having a cartridge hole which is alignable with said opening of said rotational controller to allow the element to pass through both said opening and said cartridge hole.

7. The drive assembly of claim 6, wherein said cartridge assembly is fixedly mounted to said rotational controller.

8. The drive assembly of claim 6, wherein at least a portion of said cartridge assembly comprises a ceramic.

9. The drive assembly of claim 6, wherein said cartridge assembly further comprises a seal surrounding said cartridge hole, said seal adapted to prevent gases and liquids from passing between said seal and the element which said cartridge assembly is adapted to receive.

10. The drive assembly of claim 6, further comprising:

at least one bearing provided between said cartridge assembly and said lid assembly, wherein said cartridge assembly rotates on said at least one bearing with respect to said lid assembly.

11. The drive assembly of claim 5, wherein said lid assembly comprises a chamber and a cooling jacket surrounding said chamber.

12. The drive assembly of claim 3, wherein said opening is formed at a predetermined angle to said single plane and is thereby adapted to orient the element to said single plane at said predetermined angle.

13. The drive assembly of claim 12, wherein said predetermined angle is a small acute angle with respect to a perpendicular to said single plane.

14. The drive assembly of claim 5, wherein said lid assembly is mounted to the melter at a predetermined lid assembly angle.

15. The drive assembly of claim 14, wherein said predetermined lid assembly angle is a small acute angle.

* * * * *